United States Patent [19]
Mazziotti et al.

[11] Patent Number: 5,868,622
[45] Date of Patent: Feb. 9, 1999

[54] UNIVERSAL JOINT LUBRICATION SYSTEM

[75] Inventors: Philip J. Mazziotti; Eugene E. Sowers, both of Toledo, Ohio

[73] Assignee: The Zeller Corporation, Defiance, Ohio

[21] Appl. No.: 859,281

[22] Filed: May 19, 1997

Related U.S. Application Data

[63] Continuation-in-part of Ser. No. 391,594, Feb. 21, 1995, abandoned.

[51] Int. Cl.$^6$ ....................................................... F16C 1/24
[52] U.S. Cl. ............................................. 464/14; 464/136
[58] Field of Search .................................. 464/7, 23, 11, 464/14, 131, 128, 130, 136; 137/256

[56] References Cited

U.S. PATENT DOCUMENTS

| | | | |
|---|---|---|---|
| 410,512 | 8/1889 | McElwain et al. | 464/14 |
| 666,406 | 1/1901 | Bocorselski | 464/11 |
| 1,841,349 | 1/1932 | Culbertson | 464/14 |
| 1,889,470 | 11/1932 | Garrett | 464/14 |
| 3,545,232 | 12/1970 | Neese et al. | 464/11 |
| 3,828,578 | 8/1974 | Herscovici | 464/14 |
| 3,881,324 | 5/1975 | Girguis | 464/14 |
| 4,419,086 | 12/1983 | Condon | 464/14 |
| 4,478,591 | 10/1984 | Mangiavacchi | 464/14 |
| 5,188,564 | 2/1993 | Keller | 464/14 |
| 5,660,589 | 8/1997 | Smith | 464/14 |

FOREIGN PATENT DOCUMENTS

| | | | |
|---|---|---|---|
| 59-194133 | 11/1984 | Japan | 464/7 |
| 274670 | 6/1970 | U.S.S.R. | 464/14 |
| 475465 | 6/1975 | U.S.S.R. | 464/14 |
| 972516 | 10/1964 | United Kingdom | 464/14 |

*Primary Examiner*—Eileen D. Lillis
*Attorney, Agent, or Firm*—Marshall & Melhorn

[57] ABSTRACT

A lubrication system designed particularly for small universal joints is provided. It includes a central distributions insert with a system of vertical and transverse passages which enable all four bearing cups and bearings to be sequentially lubricated from a single source. When all four are completely lubricated, lubricant appears at the top of the central distribution insert to assure that all cups have been fully lubricated. The lubrication system enables lubricant fittings to be positioned in four locations around the universal joint cross and also a central lubrication fitting can be located in the central distribution insert. The passages in the insert are positioned such that the insert can be made from one two-part mold without any mold inserts being required.

15 Claims, 5 Drawing Sheets

UNIVERSAL JOINT LUBRICATION SYSTEM

This application is a continuation-in-part of application Ser. No. 08/391,594, filed on Feb. 21, 1995 now abandoned.

This invention relates to a lubrication system for a universal joint cross assembly in which bearings are lubricated sequentially.

Heretofore, with universal joints having lubrication provisions, a cross body had a central lubricant fitting with the cross body having passages extending outwardly from a central point to each of the bearing cups. With such a system, there is no way of knowing whether each of the bearing cups and bearings received proper lubricant if, for example, lubricant was blocked by air pockets, obstructions, etc.

The present invention provides a lubrication system for a universal joint cross assembly. The cross assembly includes a universal joint cross having a body and trunnions extending outwardly at mutually perpendicular angles, bearing cups for the trunnions, and bearings between the cups and the trunnions. The universal joint cross assembly is designed particularly for smaller applications. The cross body has a distribution insert or cup located centrally therein to which lubricant is supplied. Bores are made in the cross body from the ends of the trunnions to the distribution insert and dividers are located in the bores to form two passages to each of the ends of the trunnions. Lubricant is supplied from the distribution insert to the ends of the trunnions and then back through the distribution insert sequentially until all of the trunnions and cups are lubricated. When the lubricant reaches the distribution insert after the last trunnion, it is directed to a vent in the distribution insert. When the lubricant is visible at the vent, it is assured that all of the bearings and trunnions have been properly lubricated and there is adequate lubrication for all of the bearings.

The distribution insert is designed to be made in a two-part mold not requiring any special molding inserts. This greatly decreases the cost of the mold.

The lubrication system has provisions for lubricant fittings in the cross body between the four trunnions for supplying lubricant to the insert from four locations. Threaded plugs can also be used in any location where there is no lubricant fitting to be employed. The distribution insert can also be modified to receive a central lubricant fitting therein. Hence, as many as five lubricant fittings can be employed in the lubrication system to suit the particular application.

It is, therefore, a principal object of the invention to provide a lubrication system for a universal joint cross assembly in which the bearing cups and bearings are sequentially lubricated from external lubricant fittings.

Another object of the invention to to provide a lubrication system for a universal joint cross assembly in which bearing cups and bearings are sequentially lubricated with lubricant appearing at a vent when lubrication is completed.

A further object of the invention is to provide a lubrication system in which a distribution insert is employed which can be made in a two-part mold without any mold inserts.

Yet another object of the invention is to provide a lubrication system in which lubricant can be added from fittings located in as many as five locations.

Many other objects and advantages of the invention will be apparent from the following detailed description of preferred embodiments thereof, reference being made to the accompanying drawings, in which.

Figure 1:
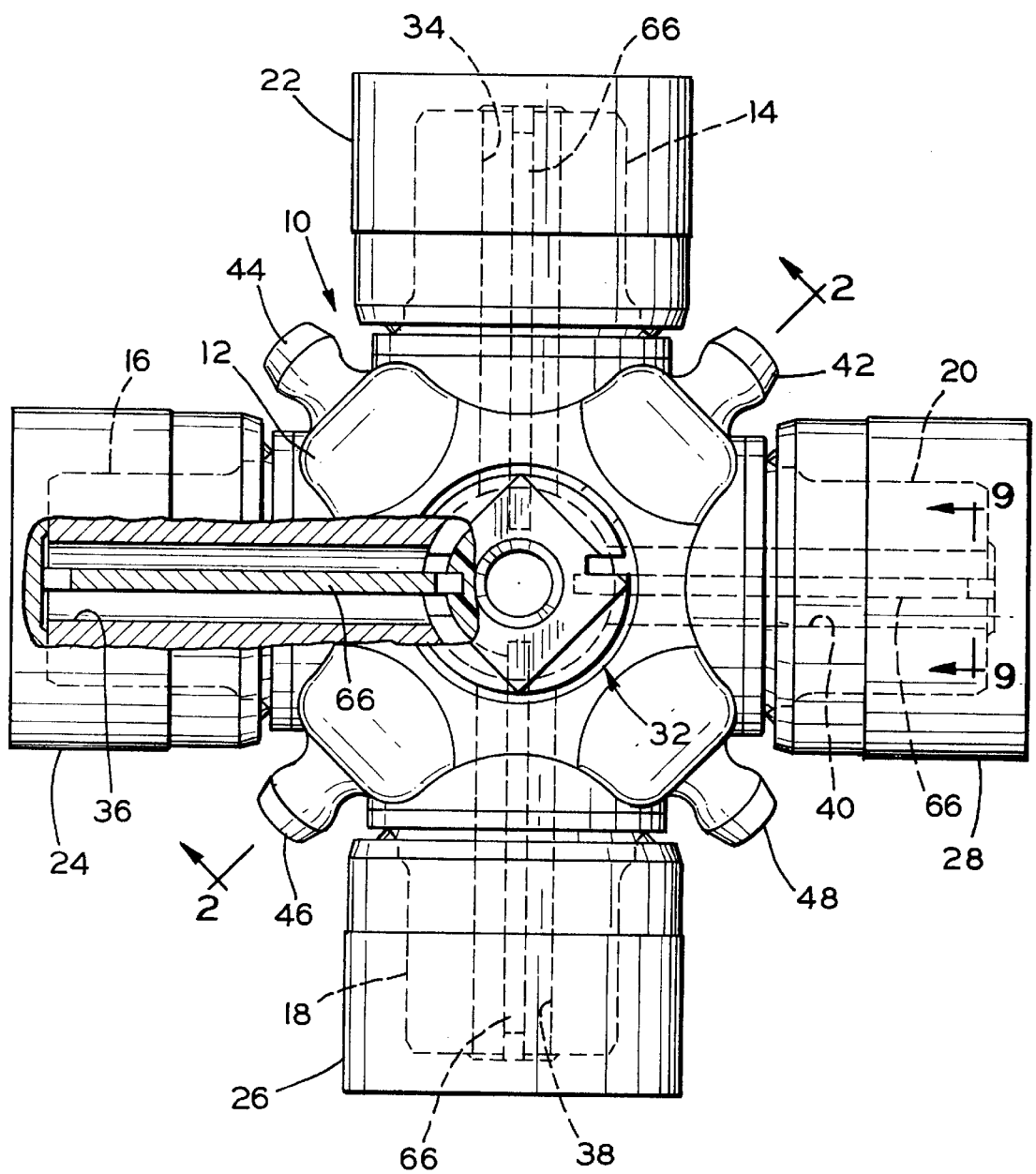
FIG. 1 is a top view of a universal joint cross assembly having a lubrication system embodying the invention, with parts broken away and with parts in cross section.
Figure 5:
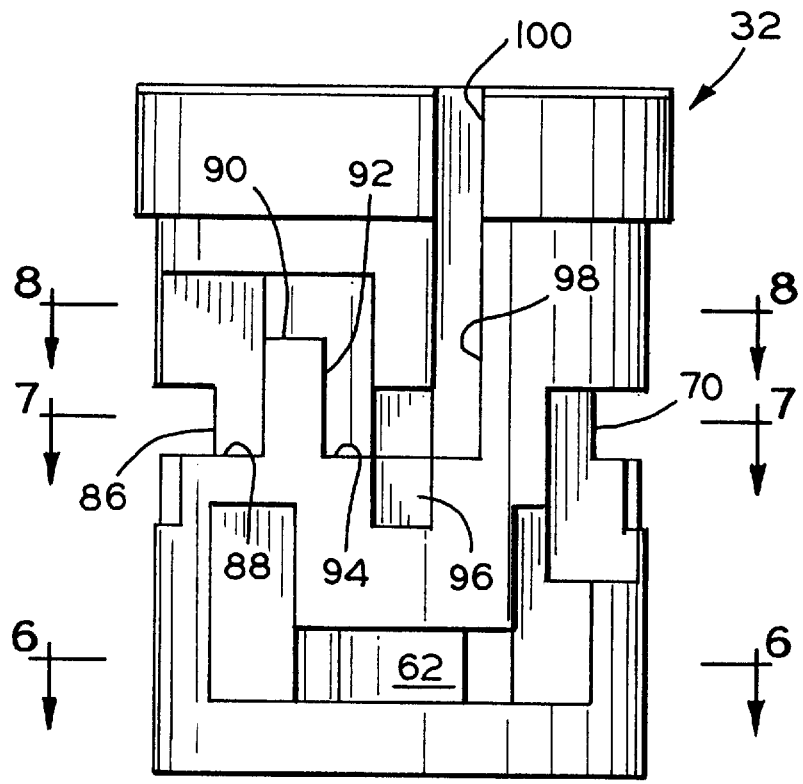
FIG. 5 is a side view in elevation of the insert of FIGS. 3 and 4.
Figure 6:
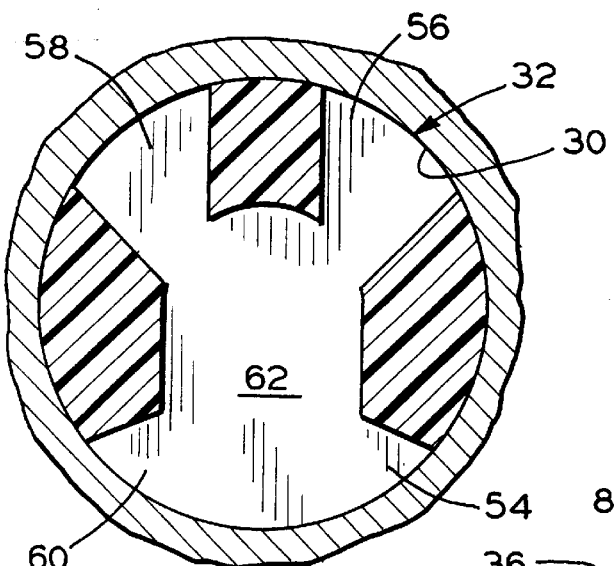
Figure 7:
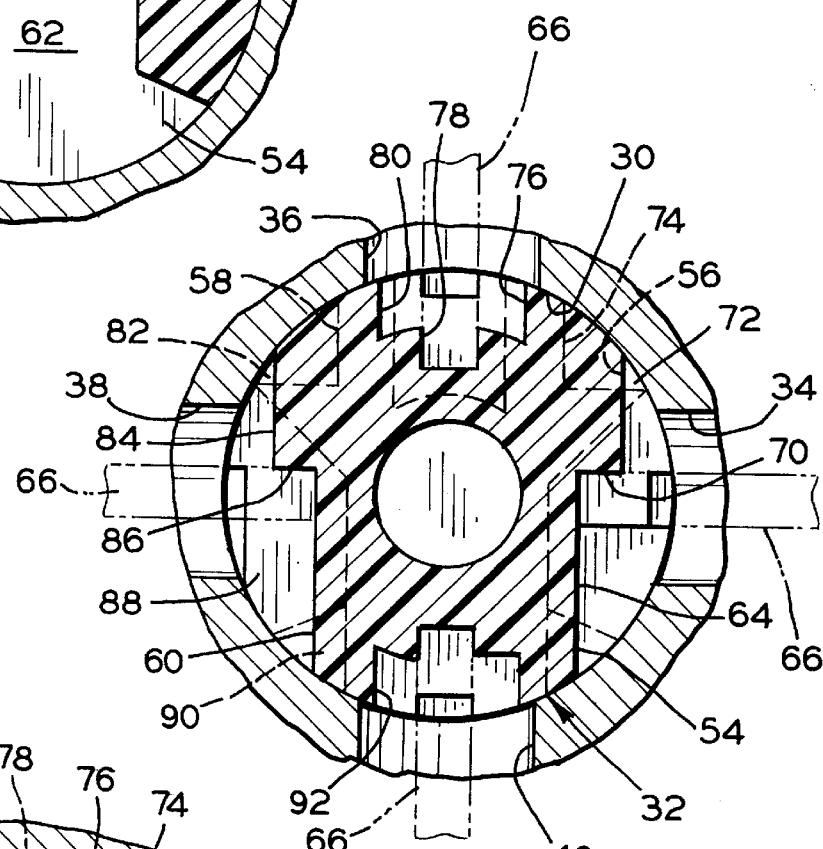
Figure 8:
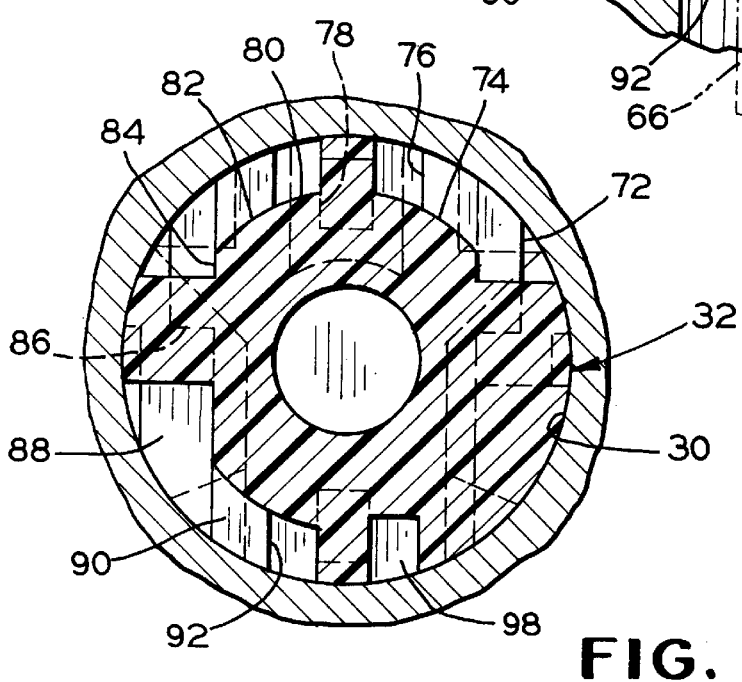
Figure 9:
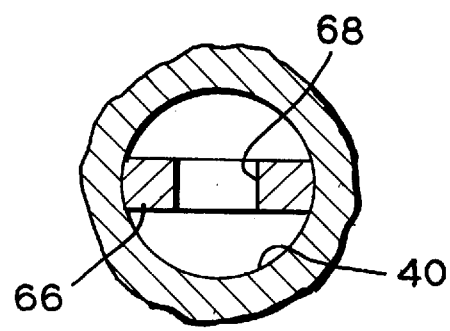
Figure 10:
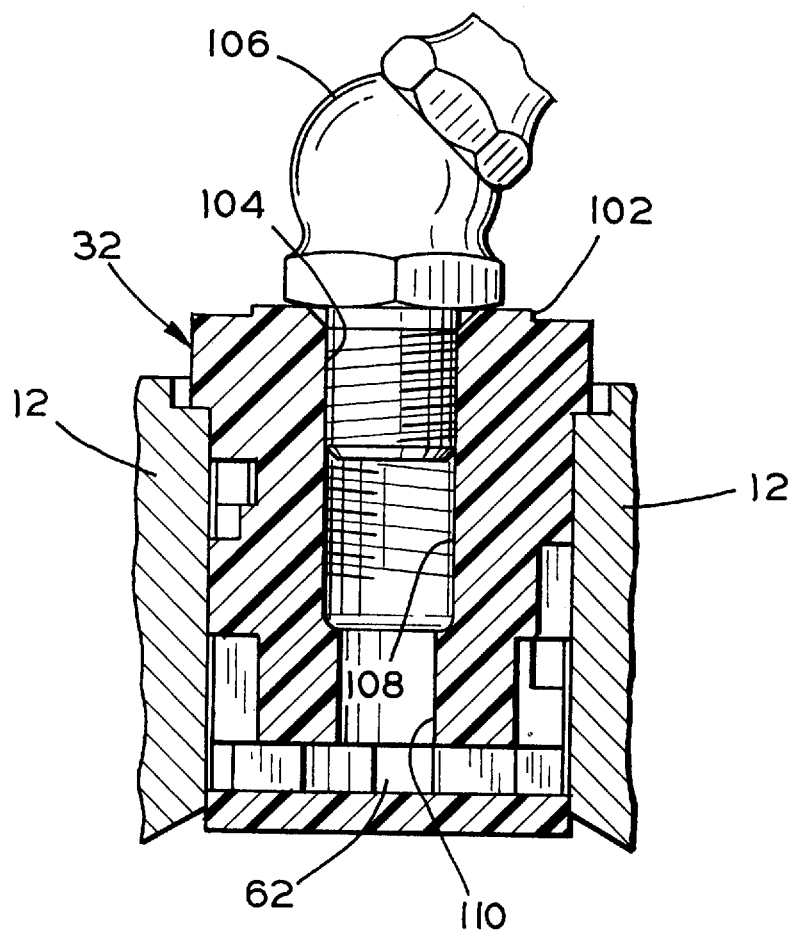

FIGS. 6, 7 and 8 are fragmentary views in cross section taken along the lines 6—6, 7—7, and 8—8, respectively, of FIG. 5;

FIG. 9 is a fragmentary view in cross section of the divider and a bore taken along the line 9—9 of FIG. 1; and FIG. 10 is a view in central cross section of a slightly modified distribution insert or cup with a central lubrication fitting.

Referring to the drawings, and more particularly to FIG. 1, a universal joint cross assembly 10 includes a cross body 12 and four trunnions 14, 16, 18, and 20 extending outwardly therefrom along mutually-perpendicular lines. There are four bearing cups 22, 24, 26, and 28 with needle bearings (not shown) between the trunnions and the cups and seals at the outer ends of said bearings.

A central cavity or hole 30 in the cross body 12 contains a distribution insert or cup 32 with a tight fit. The distribution insert 32 includes a shoulder 33 which is received in a recess 31 formed in the body 12 about the central hole 30. Bores 34, 36, 38, and 40 are formed in the body 12 and extend from the ends of the trunnions 14–20 to the central cavity 30.

Figure 2:
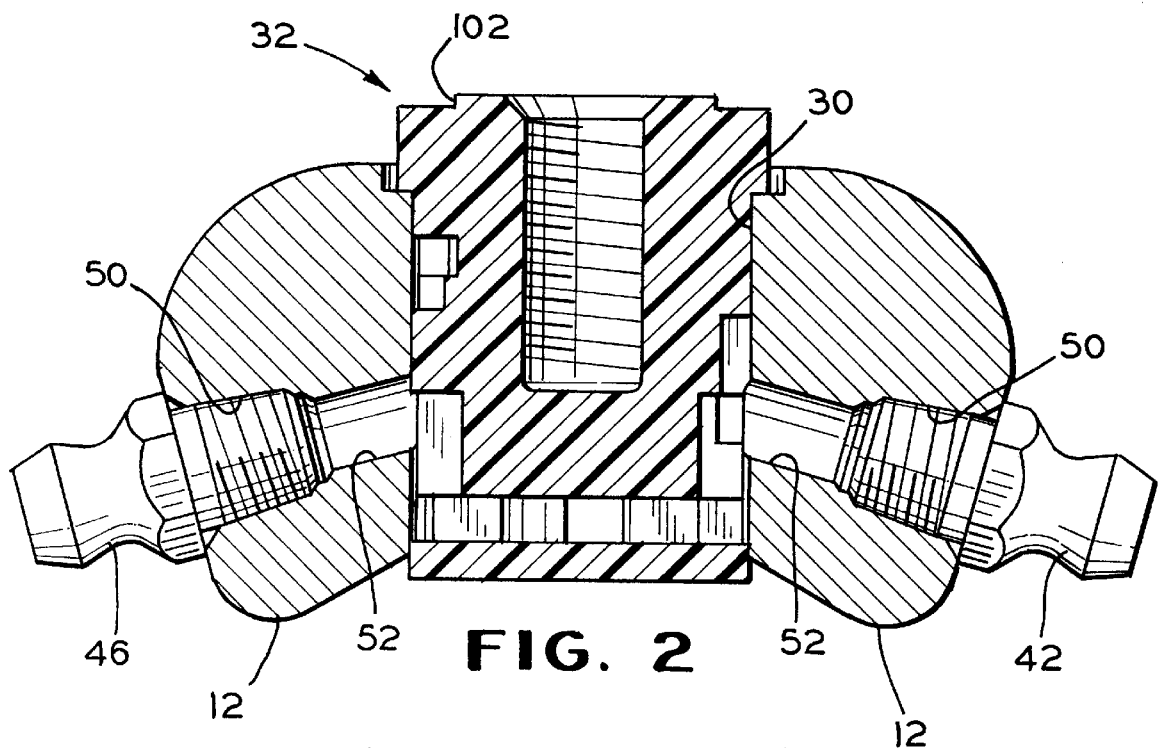
FIG. 2 is an enlarged, fragmentary view in cross section taken along the line 2—2 of FIG. 1.

Four lube fittings 42, 44, 46, and 48 can be located in the cross body 12 between the trunnions. The lube fittings are turned into threaded bores 50 (FIG. 2) and communicate with passages 52 which extend to the distribution insert 32. From here, the lubricant moves down through channels 54, 56, 58, and 60 (see FIGS. 6 and 7) to a lower manifold 62.

When the manifold 62 is full, the lubricant moves up through the channel 54 to a first transverse passage 64. From here it moves to a first vertical divider 66 which is located in the bore 34 (see FIGS. 1 and 9). The divider 66 has a notch 68 in its outer end through which lubricant can pass at the end of the trunnion 14 and a narrower tang 69 at its inner end. The inner end of the divider 66 is received in a notch 70 (FIG. 7) in the distribution insert 32. This holds the divider 66 in place and the divider also helps maintain the distribution insert 32 in place, if necessary. The lubricant moves through the bore 34 on one side of the divider 66, passes through the outer end notch 68, and travels back to the distribution insert 32 on the other side of the divider 66. The lubricant also fills the cavity in cup 22 and moves outwardly to the needle bearings (not shown) between the cup 22 and the trunnion 14.

The lubricant then moves beyond the bore 34 through transverse passages 72, 74, and 76 (see also FIG. 8) to the bore 36 containing another one of the dividers 66. The lubricant then moves out the bore 36 to the end of the trunnion 16 and back through the outer end notch of the divider, filling the cup 24 with lubricant. This second divider is received in a notch 78 in the distribution insert 32.

The lubricant then continues through transverse passages 80, 82, and 84 to the next divider 66 located in the bore 38. This divider is located in a notch 86 (see also FIG. 3) in the distribution insert 32. The lubricant then extends out the bore 38 to the end of the divider and back again to the distribution insert 32.

Figure 3:
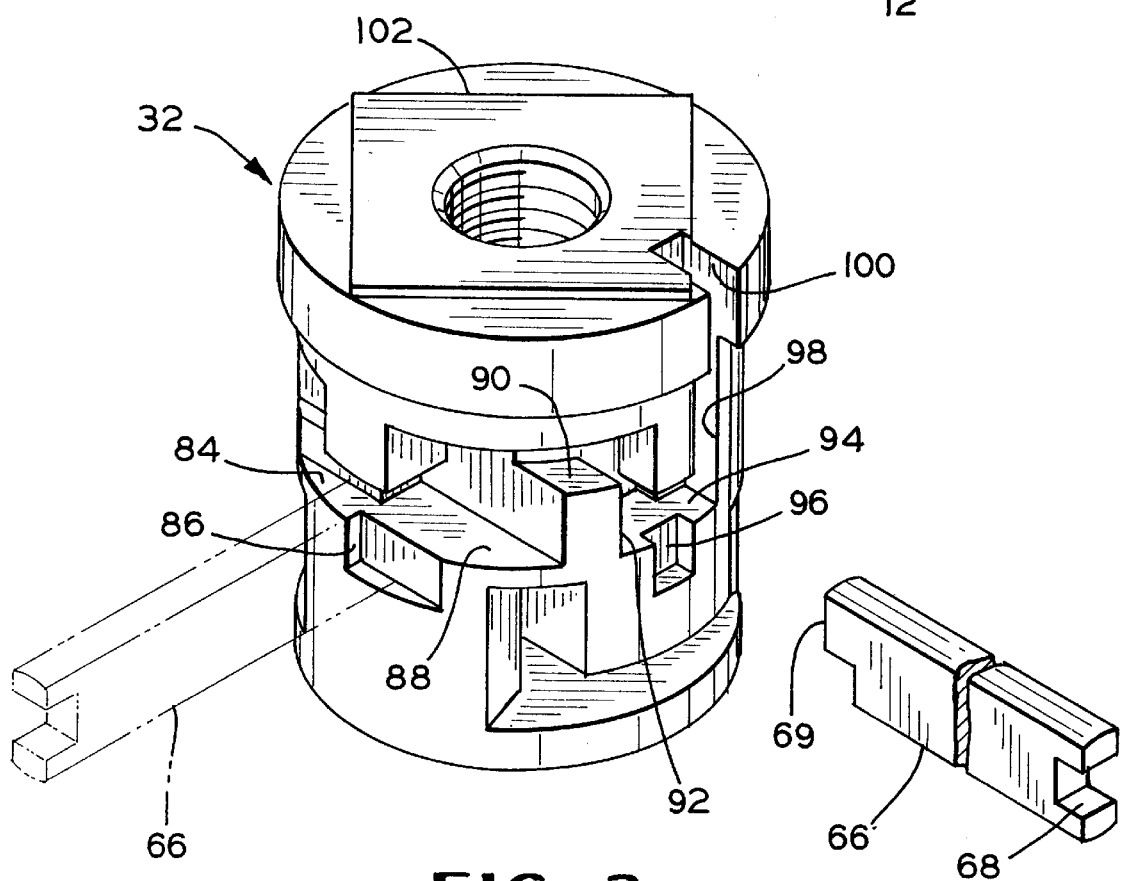
FIG. 3 is a view in perspective of a distribution insert or cup along with a divider.
Figure 4:
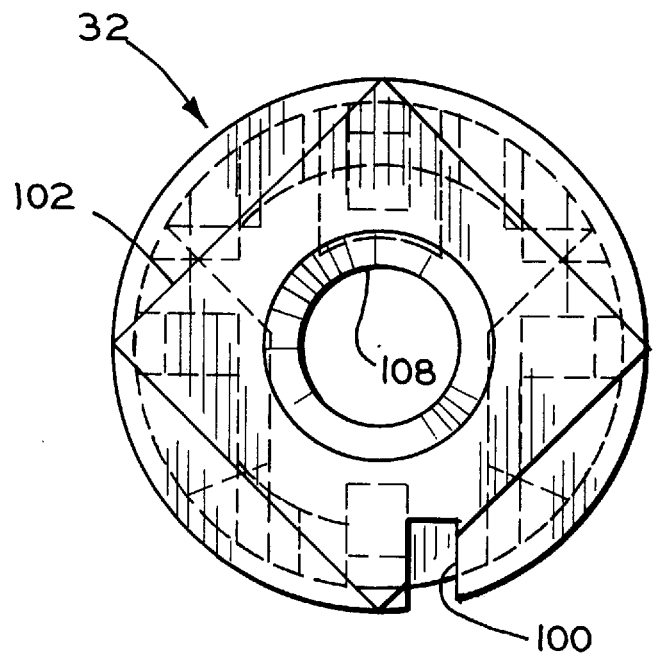
FIG. 4 is a top view of the insert of FIG. 3.

At this point, it moves through transverse passages 88, 90, and 92 (see also FIG. 3). It then contacts the divider 66 in the bore 40. The lubricant then moves through the bore along the divider 66 to the trunnion 20 and back again to a transverse passage 94, the divider in 66 this case being held in a notch 96 (FIG. 3). The lubricant then moves up a vertical passage or channel 98 to a notch 100 in the top of the distribution insert 32. When lubricant is visible at the notch 100, it is assured that all four of the cups and needle bearings have been properly lubricated.

The top has a raised square configuration 102 (FIG. 3) which is only for orientation purposes to assure that the notches for the dividers 66 are properly aligned with the bores.

As shown in FIG. 10, in particular, the distribution insert 32 can have a threaded bore 104 therein to receive a lube fitting 106 centrally located in the cross. When the central fitting 106 is employed, a recess 108 in the insert is drilled through at the bottom to form a bore 110 which communicates directly with the manifold 62. When the manifold 62 is full, the lubricant travels up the passage 54 and moves around the bores and dividers as before.

From the above, it will be seen that the lubrication system has five locations in which lube fittings can be employed. Also, with the stepped configuration of the various transverse passages, the distribution insert 32 can be made in a two-part mold without any mold inserts being necessary. Such mold inserts add substantially to the cost of the mold. Again, the lubricant system in accordance with the invention is particularly effective with small universal joints. In one instance, the distribution insert 32 is only about the size of a thimble.

Various modifications of the above-described embodiments of the invention will be apparent to those skilled in the art, and it is to be understood that such modifications can be made without departing from the scope of the invention, if they are within the spirit and the tenor of the accompanying claims.

We claim:

1. A universal joint cross assembly comprising a cross having a body and four trunnions located on mutually perpendicular lines, bearing cups for said trunnions, a distribution insert located centrally in said body, bores connecting said distribution insert and said four trunnions, a divider located in each of said bores and dividing said bores into two passages, said distribution insert having notches receiving ends of said dividers, the opposite ends of said dividers having notches therein at the lends of said trunnions, fitting means in at least two locations in said cross body for supplying lubricant to said distribution insert, said distribution insert having insert passages therein arranged such that lubricant is supplied sequentially to the four trunnions through the passages in said bores and said distribution insert having a vent at a top thereof so that when lubricant appears at the vent, all of said four trunnions are sequentially and properly lubricated.

2. A universal joint cross assembly according to claim 1 wherein said distribution insert has a manifold in a lower end thereof opposite the top and communicating with said fitting means.

3. A universal joint cross assembly according to claim 2 wherein said distribution insert has a bore therein to receive one of said fitting means with said insert bore communicating with said manifold.

4. A universal joint cross assembly according to claim 2 wherein said distribution insert has a channel communicating with said manifold and said insert passages.

5. A universal joint cross assembly according to claim 1 wherein said body has a central hole therein and said distribution insert is located in said central hole.

6. A universal joint cross assembly according to claim 5 wherein said central hole is cylindrical and said distribution insert is cylindrical and located in said central hole.

7. A universal joint cross assembly according to claim 6 wherein said distribution insert has an annular shoulder and said body has an annular recess around said central hole receiving said distribution insert shoulder.

8. A universal joint cross assembly according to claim 1 wherein there are four of said fitting means in at least four locations in said cross body between said four trunnions.

9. A universal joint cross assembly comprising a cross having a body and four trunnions located on mutually perpendicular lines, bearing cups for said trunnions, said cross body having a central bole therein, a distribution insert located in said central hole with a tight fit, bores connecting said distribution insert and said four trunnions, a divider located in each of said bores and dividing said bores into two passages, said distribution insert having notches receiving ends of said dividers, the opposite ends of said dividers having notches therein at the ends of said trunnions, fitting means for supplying lubricant to said distribution insert, said distribution insert having passages therein arranged such that lubricant is supplied sequentially through the four trunnions through the passages in said bores, and said distribution insert having a vent positioned so that when lubricant appears at the vent, all of said four trunnions and said bearing cups are sequentially and properly lubricated.

10. A universal joint cross assembly according to claim 9 wherein said distribution insert has a manifold in a lower end thereof opposite the top and communicating with said fitting means.

11. A universal joint cross assembly according to claim 10 wherein said distribution insert has a bore therein to receive one of said fitting means with said insert bore communicating with said manifold.

12. A universal joint cross assembly according to claim 10 wherein said distribution insert has a channel communicating with said manifold and said insert passages.

13. A universal joint cross assembly according to claim 9 wherein said central hole is cylindrical and said distribution insert is cylindrical and located in said central hole.

14. A universal joint cross assembly according to claim 13 wherein said distribution insert has an annular shoulder and said body has an annular recess around said central hole receiving said distribution insert shoulder.

15. A universal joint cross assembly according to claim 9 wherein there are four of said fitting means in at least four locations in said cross body between said four trunnions.

* * * * *